United States Patent [19]

Yajima et al.

[11] 4,347,347

[45] Aug. 31, 1982

[54] CROSSLINKED ORGANOMETALLIC BLOCK COPOLYMERS AND PROCESS FOR PRODUCTION THEREOF

[75] Inventors: Seishi Yajima; Kiyohito Okamura; Yoshio Hasegawa; Takemi Yamamura, all of Oharai, Japan

[73] Assignee: Ube Industries, Ltd., Ube, Japan

[21] Appl. No.: 160,516

[22] Filed: Jun. 18, 1980

[30] Foreign Application Priority Data

Jun. 28, 1979 [JP] Japan .................................. 54-80792
Mar. 21, 1980 [JP] Japan .................................. 54-34909

[51] Int. Cl.³ ...................... C08G 77/60; C08G 77/54
[52] U.S. Cl. .................................. 528/30; 260/429.3; 260/429.5; 528/10; 528/17; 528/31; 528/33; 528/35; 528/39; 528/14; 556/431; 556/435; 204/159.13
[58] Field of Search .......................... 260/429.3, 429.5; 528/10, 17, 30, 14, 31, 33, 35, 39; 556/431, 435

[56] References Cited

U.S. PATENT DOCUMENTS

| 2,680,723 | 6/1954 | Kronstein | 528/30 |
| 2,716,656 | 8/1955 | Boyd | 528/39 |
| 3,057,822 | 10/1962 | Rust et al. | 528/30 X |
| 3,625,934 | 12/1971 | Rinse | 528/39 |
| 3,814,730 | 6/1974 | Karstedt | 528/30 X |
| 4,072,655 | 2/1978 | Louis et al. | 528/39 X |
| 4,151,344 | 4/1979 | Doss et al. | 528/31 X |
| 4,159,259 | 6/1979 | Yajima et al. | 528/14 |

FOREIGN PATENT DOCUMENTS

| 581062 | 8/1959 | Canada | 528/30 |
| 869583 | 4/1971 | Canada | 528/17 |
| 1156192 | 10/1963 | Fed. Rep. of Germany | 528/17 |
| 766810 | 1/1957 | United Kingdom | 528/30 |

Primary Examiner—Floyd D. Higel
Attorney, Agent, or Firm—Ladas & Parry

[57] ABSTRACT

A process for producing an organometallic copolymer composed of a polycarbosilane portion and a polymetallosiloxane portion crosslinked with each other, which comprises reacting (1) a polycarbosilane having a main chain skeleton composed mainly of carbosilane units of the formula $+Si-CH_2+$, with (2) a polymetallosiloxane having a main chain skeleton composed of metalloxane units of the formula $+M-O+$ wherein M represents Ti or Zr and siloxane units of the formula $+Si-O+$, in an organic solvent in an inert atmosphere thereby to bond at least some of the silicon atoms of said polycarbosilane to at least some of the metal atoms M and/or silicon atoms of said polymetallosiloxane through an oxygen atom; and the organometallic copolymer obtained by the aforesaid process.

3 Claims, 16 Drawing Figures (POLYTITANOSILOXANE)

(POLYCARBOSILANE)

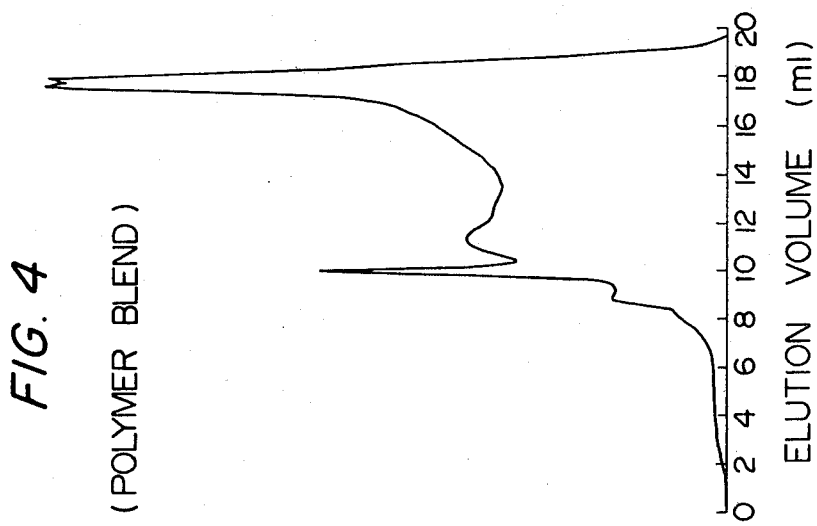
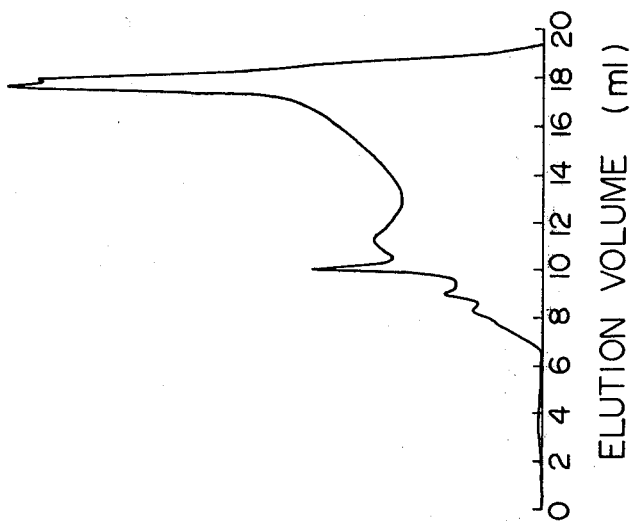

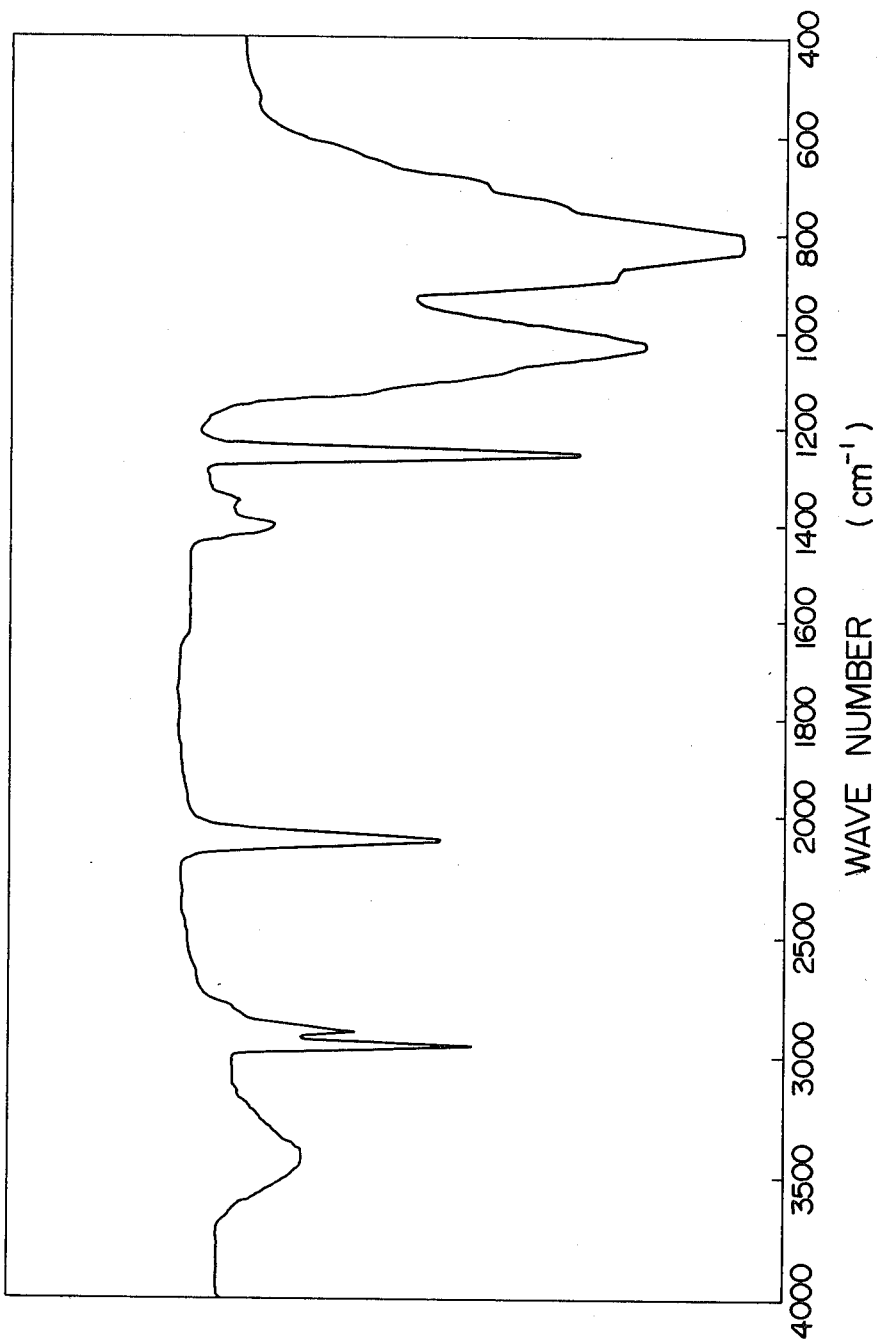
FIG. 5 (POLYCARBOSILANE)

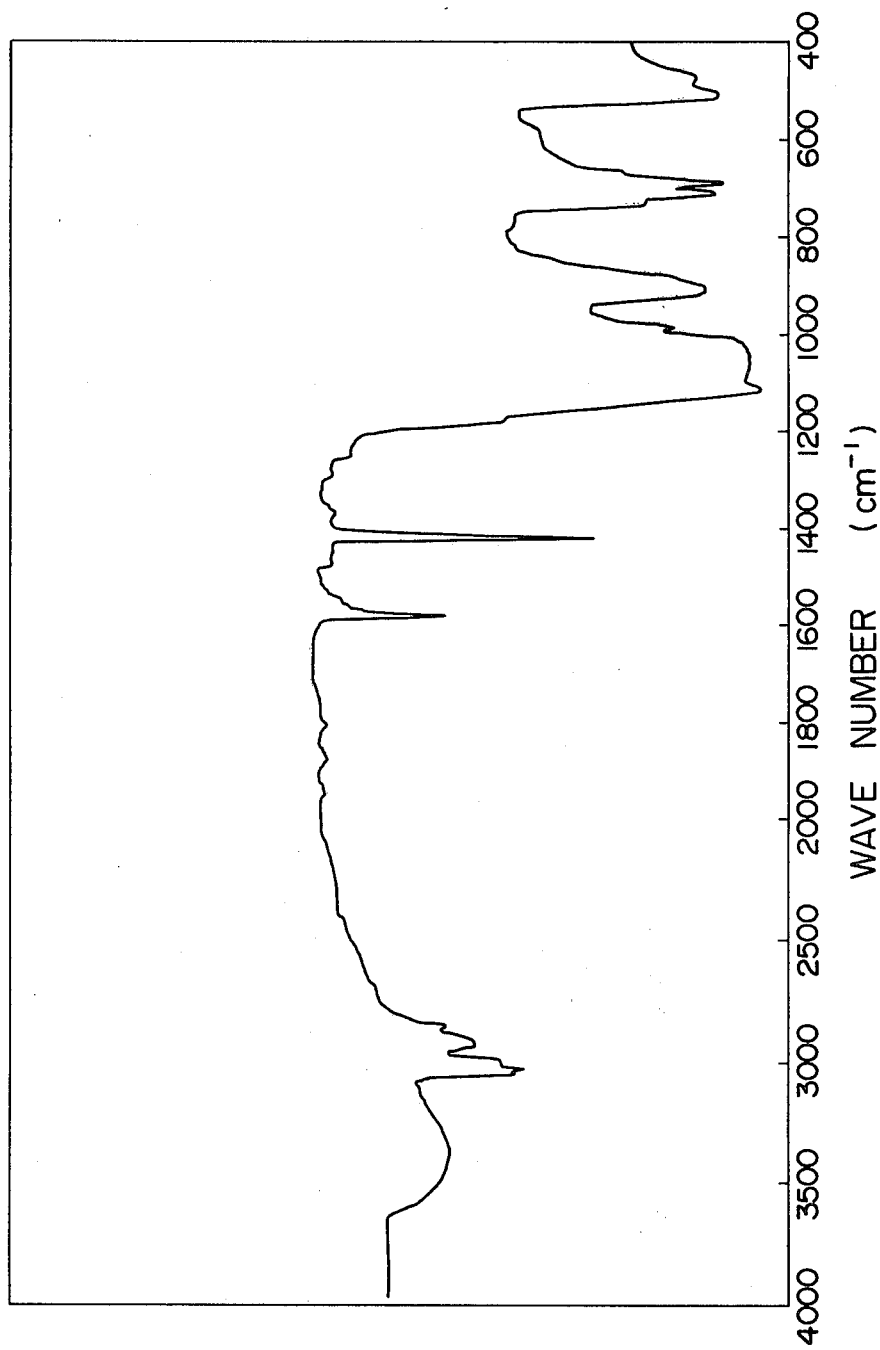
FIG. 6 (POLYTITANOSILOXANE)

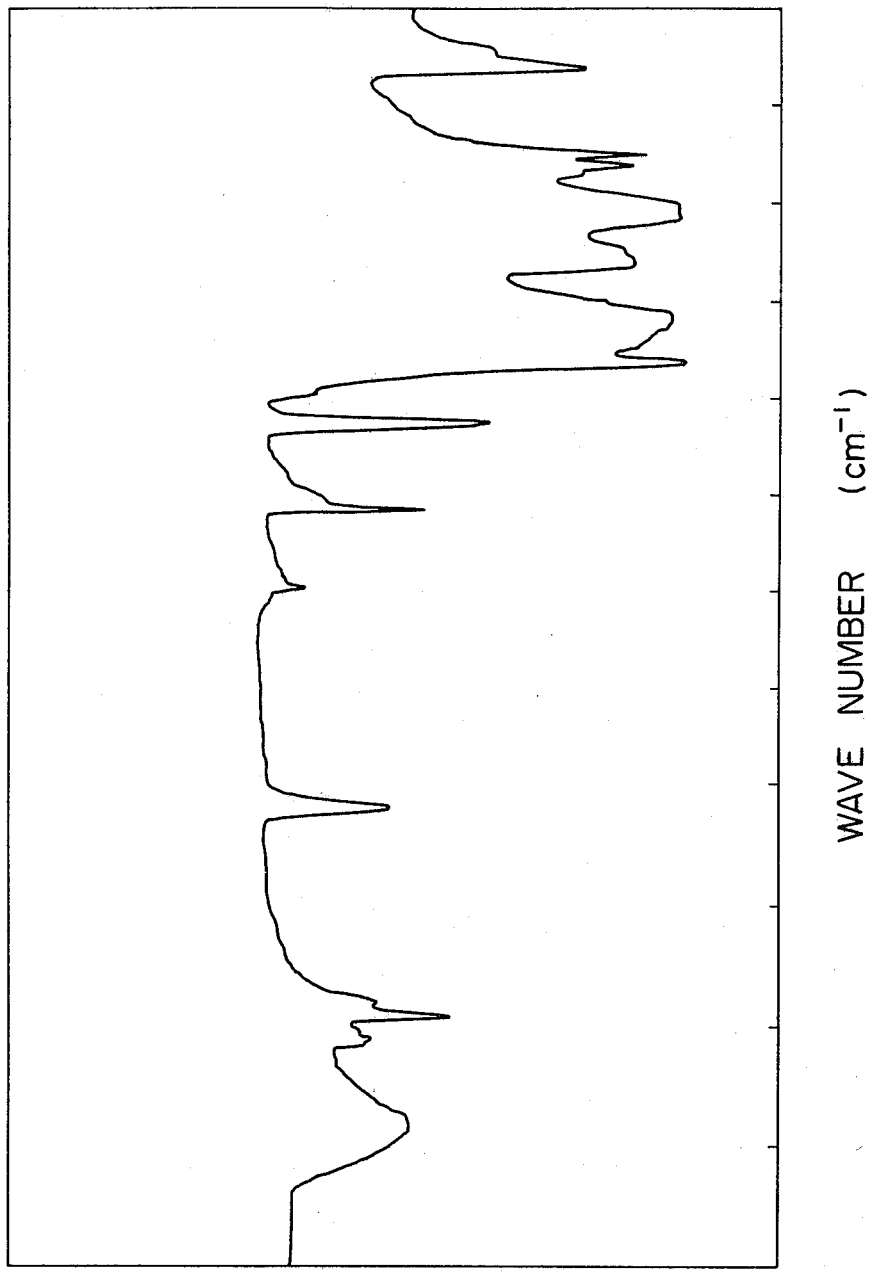
FIG. 7 (COPOLYMER OF THE INVENTION)
WAVE NUMBER (cm$^{-1}$)

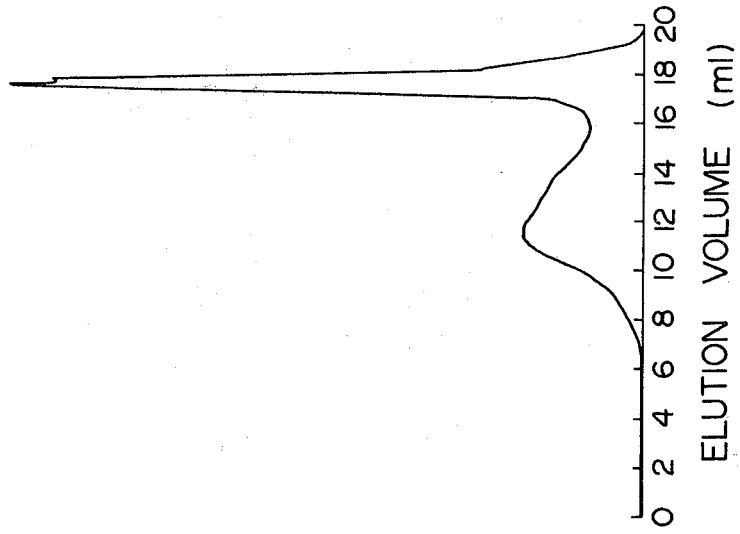
FIG. 10 (POLYZIRCONOSILOXANE)
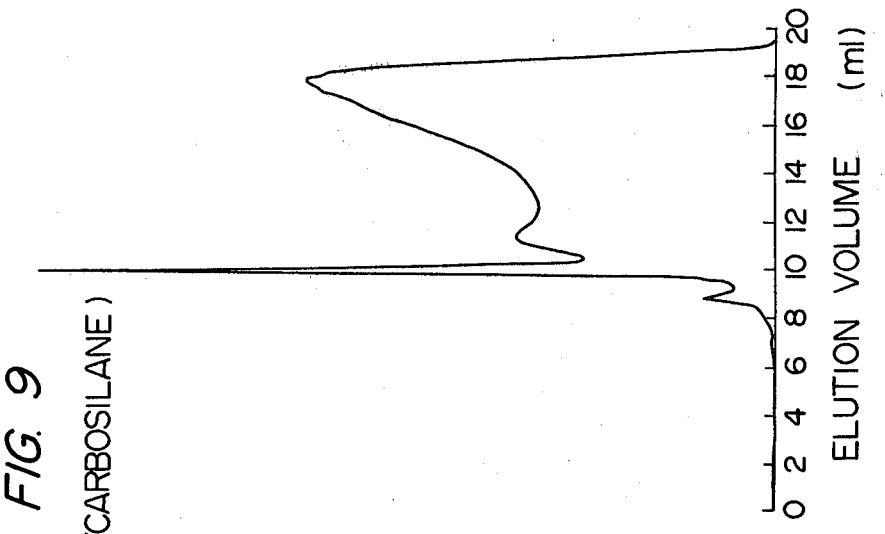
FIG. 9 (POLYCARBOSILANE)

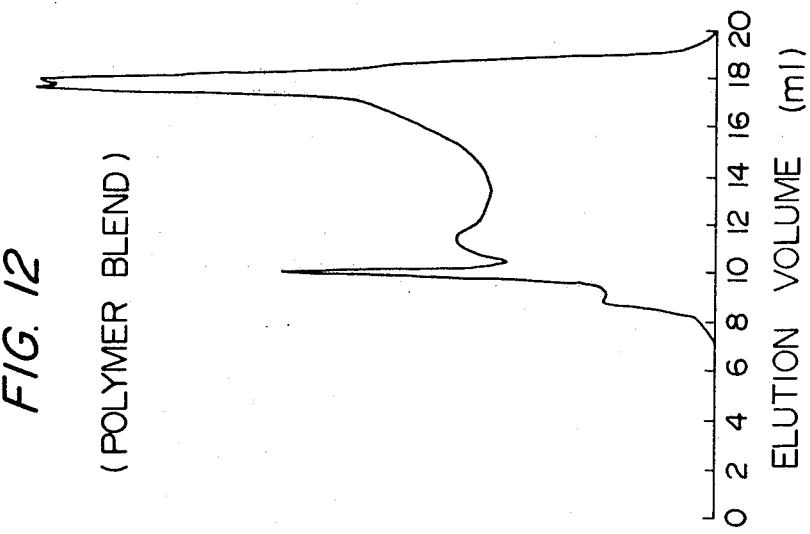
FIG. 12 (POLYMER BLEND)
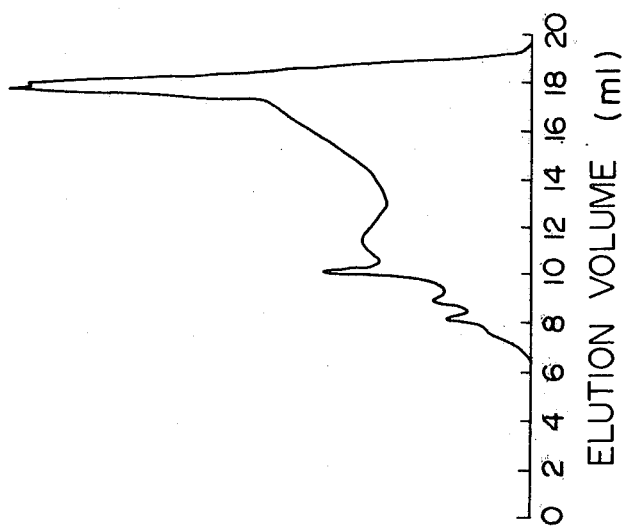
FIG. 11 (COPOLYMER OF THE INVENTION)

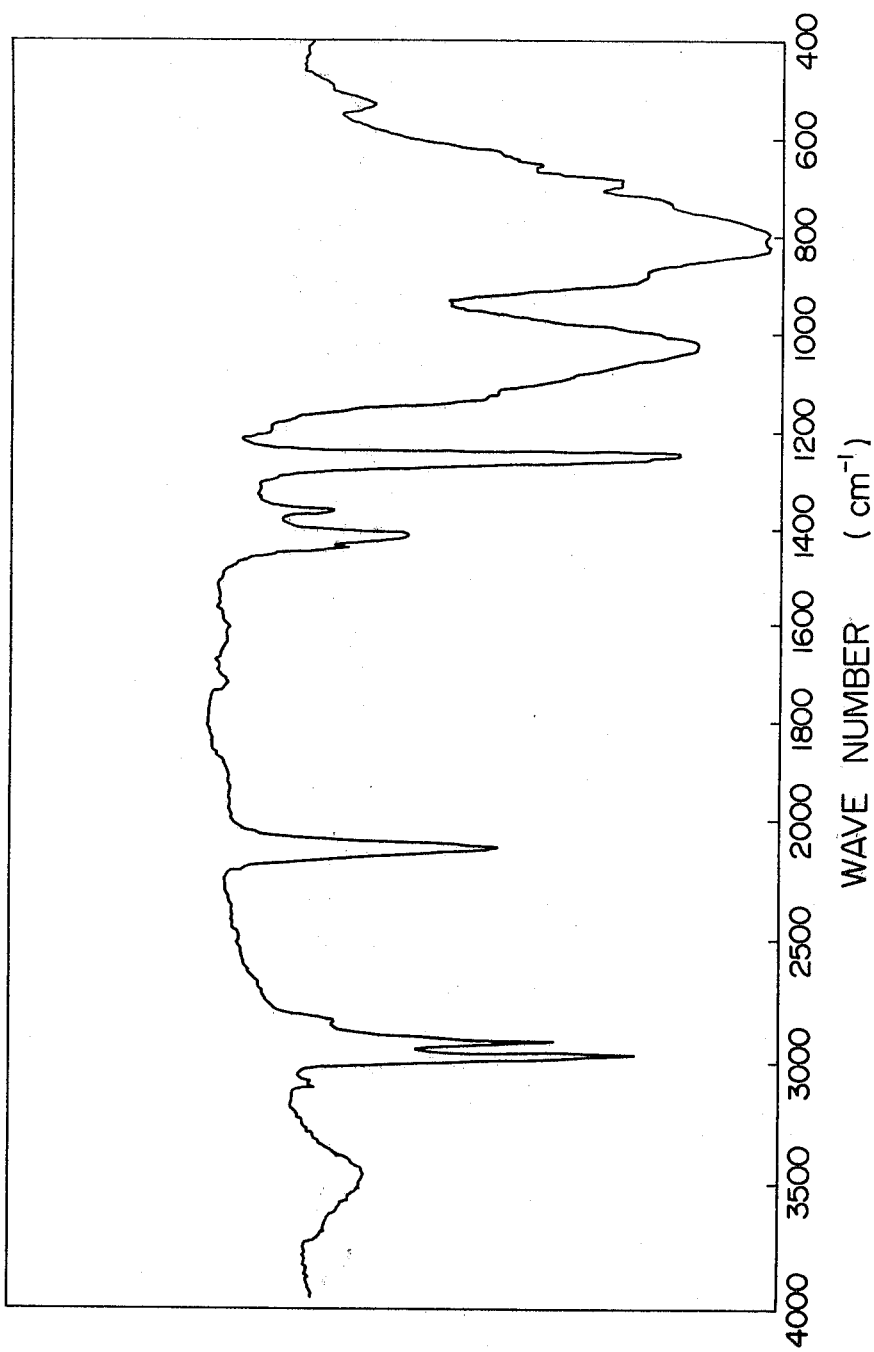
FIG. 13 (POLYCARBOSILANE)

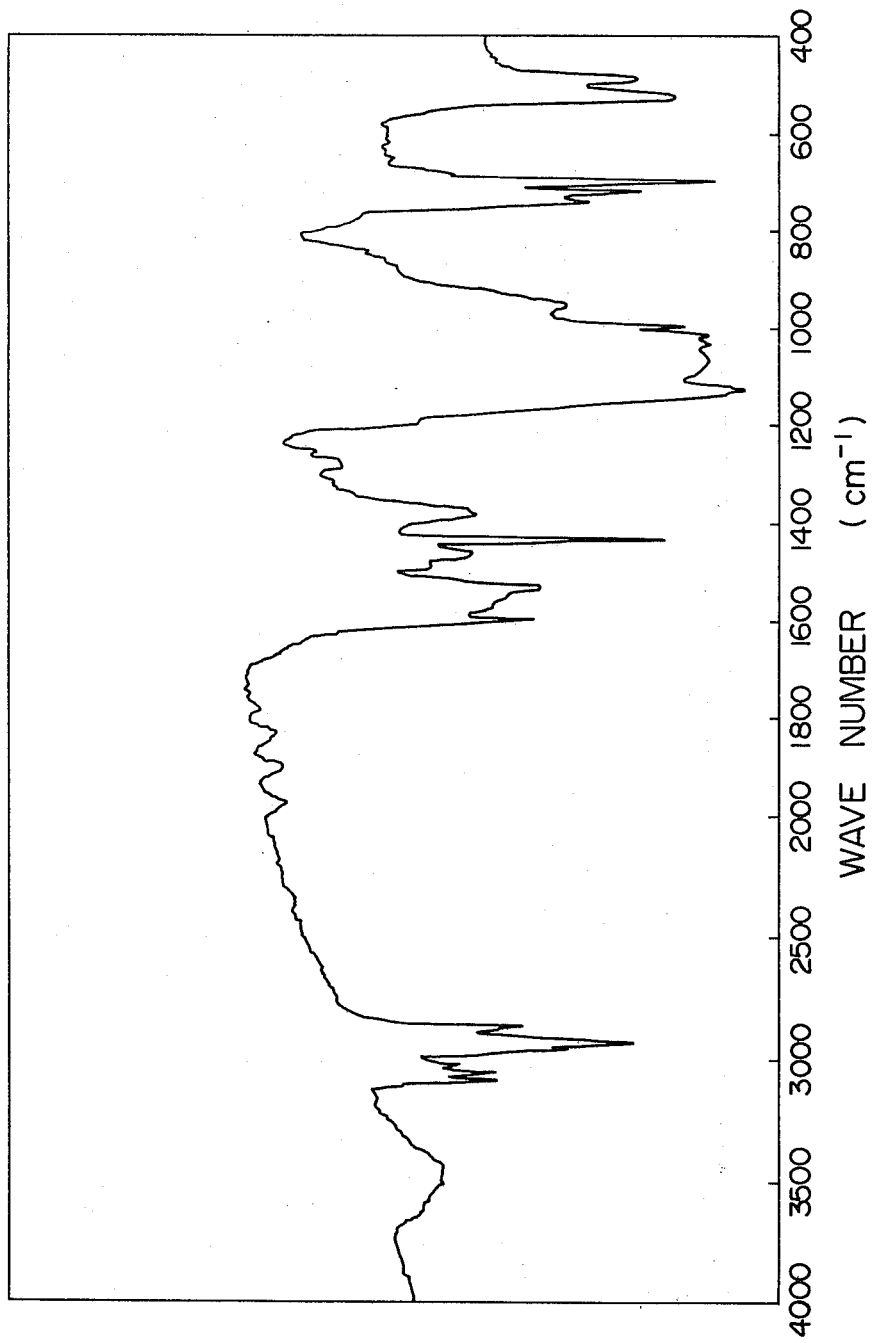
FIG. 14 (POLYZIRCONOSILOXANE)

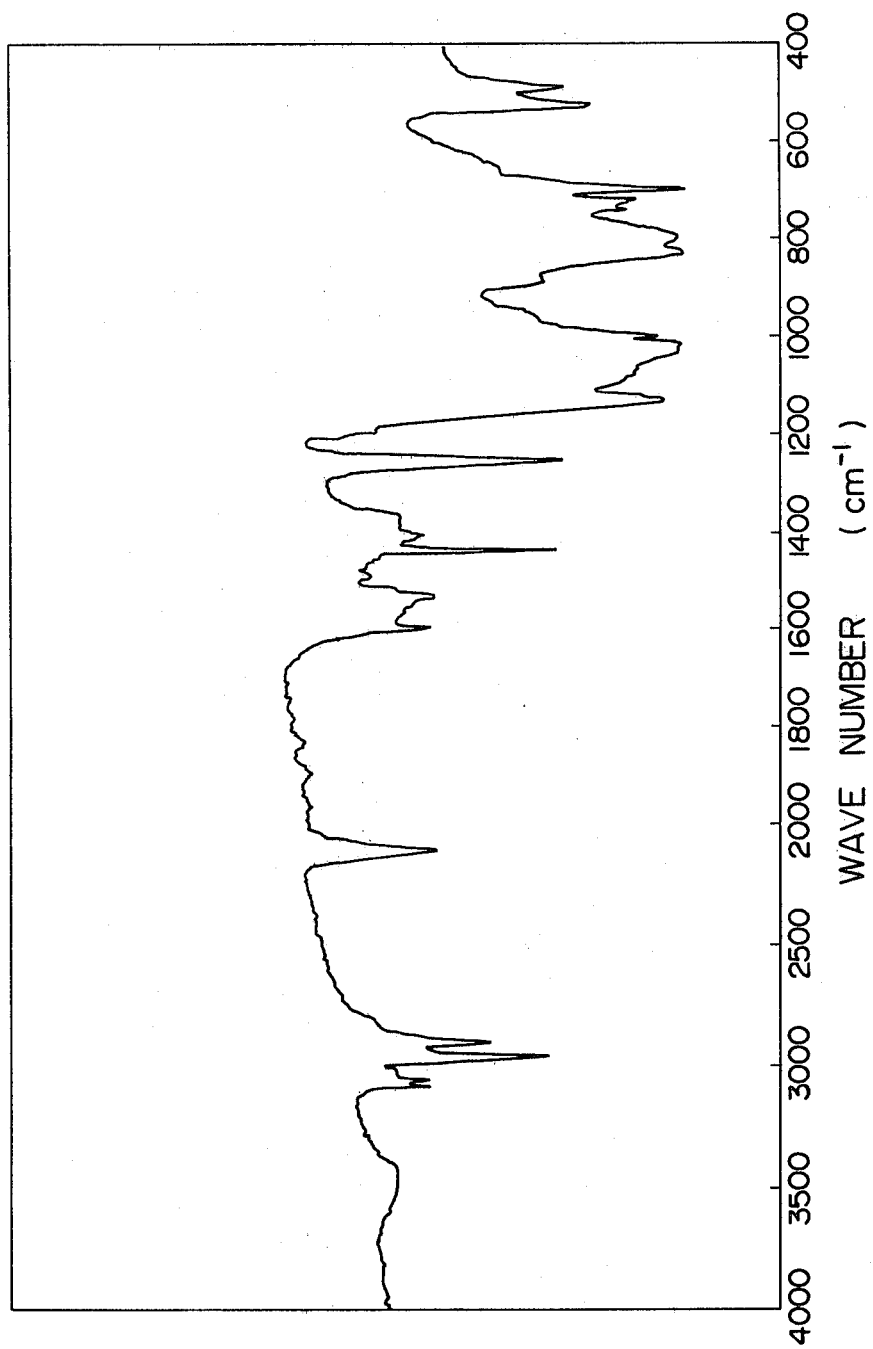
FIG. 15 (COPOLYMER OF THE INVENTION)

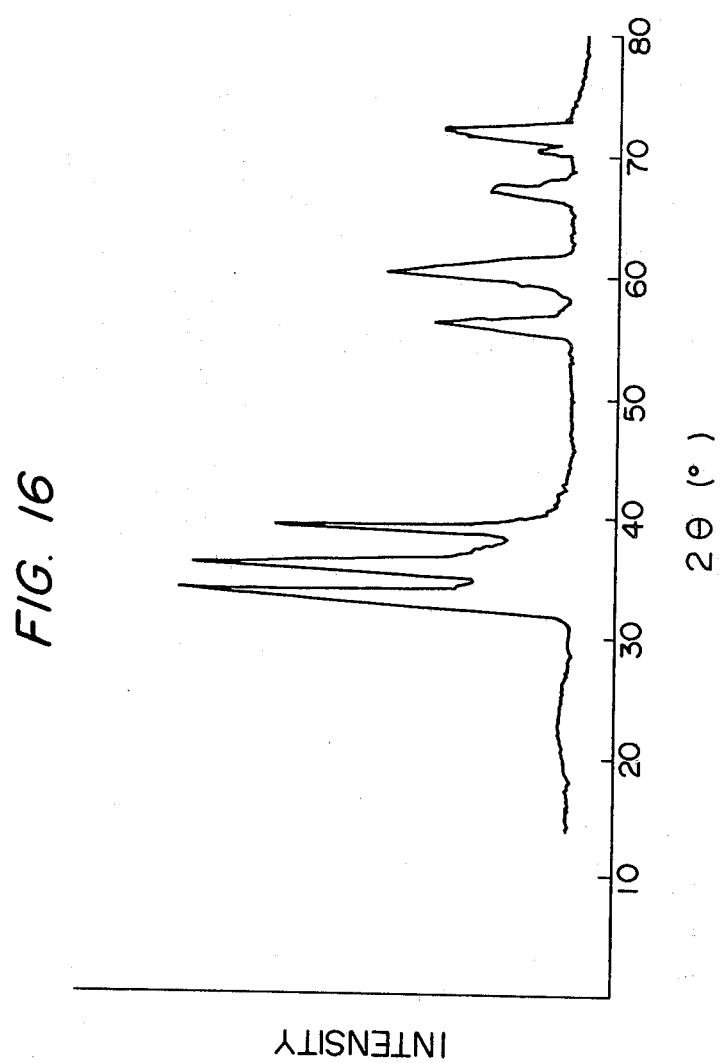

CROSSLINKED ORGANOMETALLIC BLOCK COPOLYMERS AND PROCESS FOR PRODUCTION THEREOF

BACKGROUND OF THE INVENTION

This invention relates to novel crosslinked block copolymers composed of a polycarbosilane portion consisting mainly of units of the formula $+Si-CH_2+$ and a polymetallosiloxane portion consisting of units of the formula $+M-O+$ in which M is Ti or Zr and units of the formula $+Si-O+$, and to a process for production thereof.

It is known that polycarbosilane, a polymer having a main chain skeleton composed of $+Si-CH_2+$ with two sidechain groups bonded to each silicon atom, is converted to an inorganic carbide SiC on firing, and therefore SiC fibers having good mechanical and thermal properties can be produced by molding polycarbosilane into fibers and firing the resulting fibers. The present inventors disclosed this technique is U.S. Pat. No. 4,100,233.

The present inventors also disclosed in U.S. Patent Application Ser. No. 953,518 filed Oct. 23, 1978 that polycarbosilane whose main chain skeleton is composed mainly of $+Si-CH_2+$ and contains a minor proportion of $+Si-O+$ is an especially good material for production of SiC fibers.

The present inventors assiduously furthered their investigations on organometallic polymers, and have now found novel copolymers composed of a polycarbosilane portion and a polymetallosiloxane portion which are bonded to each other by crosslinking. They have found that these novel copolymers are very useful because composite inorganic carbide fibers having better properties than SiC fibers obtained from conventional polycarbosilane can be produced by molding such a copolymer into fibers and firing the resulting fibers.

SUMMARY OF THE INVENTION

According to this invention, there is provided an organometallic copolymer having a number average molecular weight of about 1000 to about 50000 composed of (A) a polycarbosilane portion with a number average molecular weight of about 500 to about 10000 having a main chain skeleton composed mainly of carbosilane units of the formula $+Si-CH_2+$ and (B) a polymetallosiloxane portion with a number average molecular weight of about 500 to about 10000 having a main chain skeleton composed of metalloxane units of the formula $+M-O+$ wherein M represents a metal atom selected from the group consisting of Ti and Zr and siloxane units of the formula $+Si-O+$; each silicon atom of said carbosilane units having bonded thereto a side-chain group selected from the group consisting of hydrogen, lower alkyl and phenyl, most of the metal atoms M in said metalloxane units having bonded thereto a side-chain group selected from the group consisting of lower alkoxy, phenoxy and acetylacetoxy, most of the silicon atoms of said siloxane units having bonded thereto a side-chain group selected from the group consisting of alkyl and phenyl, the ratio of the total number of said metalloxane units to that of said siloxane units being in the range of from about 30:1 to about 1:30, the ratio of the total number of said carbosilane units to the sum of the total number of said metalloxane units and the total number of said siloxane units being in the range of about 100:1 to about 1:100, and at least some of the silicon atoms of said polycarbosilane portion (A) being bonded through oxygen to at least some of the metal atoms M and/or silicon atoms of said polymetallosiloxane portion (B) whereby the polycarbosilane portion (A) is crosslinked with the polymetallosiloxane portion (B).

This particular organometallic copolymer is a thermoplastic material which melts upon heating, and is soluble in an organic solvent.

In accordance with this invention, the organometallic copolymer of this invention can be produced by a process which comprises mixing (1) polycarbosilane with a number average molecular weight of about 500 to about 10000 having a main chain skeleton composed mainly of carbosilane units of the formula $+Si-CH_2+$, each silicon atom of said carbosilane units substantially having bonded thereto a side-chain group selected from the group consisting of hydrogen, lower alkyl and phenyl, with (2) a polymetallosiloxane with a number average molecular weight of about 500 to about 10000 having a main chain skeleton composed of metalloxane units of the formula $+M-O+$ wherein M represents a metal atom selected from the group consisting of Ti and Zr and siloxane units of the formula $+Si-O+$, most of the metal atoms M of said metalloxane units having bonded thereto a side-chain group selected from the group consisting of lower alkoxy, phenoxy and acetylacetoxy, most of the silicon atoms of said siloxane units having bonded thereto a side-chain group selected from the class consisting of lower alkyl and phenyl, the ratio of the total number of said metalloxane units to that of said siloxane units being in the range of from about 30:1 to about 1:30, in such proportions that the ratio of the total number of said carbosilane units to the sum of the total number of said metalloxane units and the total number of said siloxane units is in the range of from about 100:1 to about 1:100; heating the resulting mixture in an organic solvent in an atmosphere inert to the reaction to bond at least some of the silicon atoms of said polycarbosilane to at least some of the metal atoms M and/or silicon atoms of said polymetallosiloxane through an oxygen atom.

In the aforesaid process, at least one of the side chain groups bonded to the silicon atom in the carbosilane units is preferably a hydrogen atom.

BRIEF DESCRIPTION OF THE DRAWINGS

FIG. 3 is a gel permeation chromatogram of the organometallic copolymer obtained in Example 1;

FIG. 4 is a gel permeation chromatogram of a blend of the polycarbosilane obtained in Referential Example 1 and the polytitanosiloxane obtained in Referential Example 2 in a weight ratio of 1:1;

FIG. 5 is an infrared absorption spectrum of the polycarbosilane obtained in Referential Example 1;

FIG. 6 is an infrared absorption spectrum of the polytitanosiloxane obtained in Referential Example 2;

FIG. 7 is an infrared absorption spectrum of the organometallic copolymer obtained in Example 1;

FIG. 9 is a gel permeation chromatogram of the polycarbosilane obtained in Referential Example 3;

FIG. 10 is a gel permeation chromatogram of the polyzirconosiloxane obtained in Referential Example 4;

FIG. 11 is a gel permeation chromatogram of the organometallic copolymer obtained in Example 4;

FIG. 12 is a gel permeation chromatogram of a blend of the polycarbosilane obtained in Referential Example 3 and the polyzirconosiloxane obtained in Referential Example 4 in a weight ratio of 1:1;

FIG. 13 is an infrared absorption spectrum of the polycarbosilane obtained in Referential Example 3;

FIG. 14 is an infrared absorption spectrum of the polyzirconosiloxane obtained in Referential Example 4;

FIG. 15 is an infrared absorption spectrum of the organometallic copolymer obtained in Example 4; and

FIG. 16 is an X-ray powder diffraction pattern of a composite carbide obtained by firing the organometallic copolymer of Example 4 at 1700° C. in a nitrogen atmosphere.

DETAILED DESCRIPTION OF THE INVENTION

The organometallic copolymer of this invention is a crosslinked block copolymer obtained by crosslinking polycarbosilane and polymetallosiloxane (polytitanosiloxane or polyzirconosiloxane) by block copolymerization. Ordinary block copolymers are obtained by bonding the individual blocks to each other at their terminals, and are therefore composed of a series of blocks connected to each other heat-to-tail. In contrast, the organometallic copolymer of this invention is of the structure in which some of the silicon atoms of the structural units $-\!\!+\!\text{Si-CH}_2\!\!+\!\!-$ present in the intermediate portion of the main chain skeleton of the polycarbosilane portion are bonded to some of the silicon atoms and/or metal atoms (M) of the structural units $-\!\!+\!\text{Si-O}\!\!+\!\!-$ and/or $-\!\!+\!\text{M-O}\!\!+\!\!-$ present in the intermediate portion of the main chain skeleton of the polymetallosiloxane portion through an oxygen atom. In other words, the organometallic copolymer of this invention is a crosslinked block copolymer of the unique structure wherein the polycarbosilane portion (A) and the polymetallosiloxane portion (B) are not bonded head-to-tail, but are crosslinked in the intermediate portion of the main chain linkage.

The organometallic copolymer of this invention is a novel polymer. Polycarbosilane itself and polymetallosiloxanes themselves are known polymers, but a copolymer composed of carbosilane and a metallosiloxane has not been known to date. The crosslinked block copolymer composed of polycarbosilane and polymetallosiloxane bonded to each other in such a unique mode as mentioned above has never been known in the past.

It can be ascertained by gel permeation chromatography (GPC) and infrared absorption spectroscopy (IR) that the organometallic copolymer of this invention is a crosslinked block copolymer composed of the polycarbosilane portion and the polymetallosiloxane portion. The results of these analysis are described specifically below by reference to the accompanying drawings taking up an organometallic copolymer composed of a polycarbosilane portion and a polytitanosiloxane portion as one embodiment of this invention.

Figure 2:
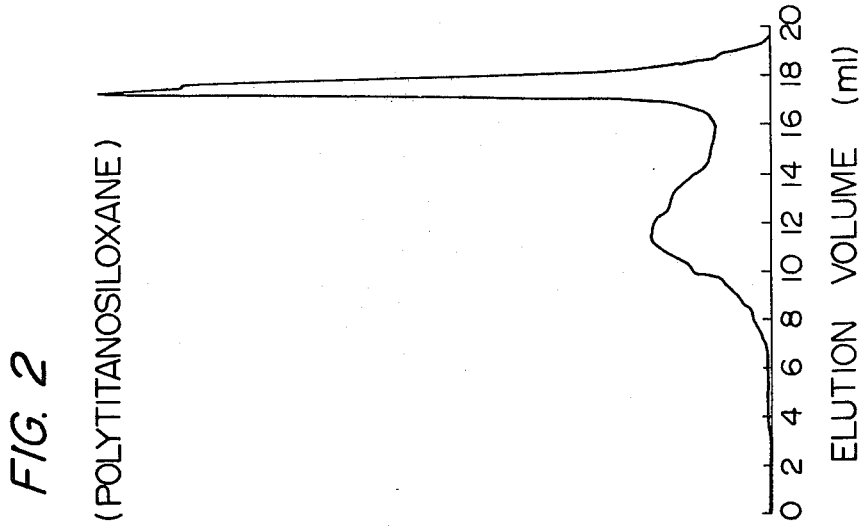
FIG. 2 is a gel permeation chromatogram of the polytitanosiloxane obtained in Referential Example 2.
Figure 1:
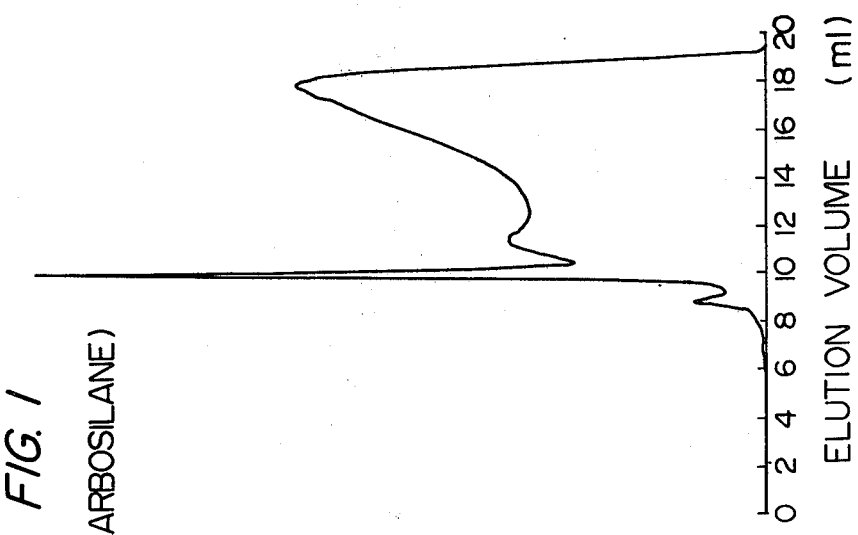
FIG. 1 is a gel permeation chromatogram of the polycarbosilane obtained in Referential Example 1.

FIG. 1 shows a gel permeation chromatogram of the polycarbosilane obtained by the method of Referential Example 1; FIG. 2 shows a gel permeation chromatogram of the polytitanosiloxane obtained by the method of Referential Example 2; and FIG. 3 is a gel permeation chromatogram of the organometallic copolymer of this invention obtained by reacting the polycarbosilane and polytitanosiloxane in a weight ratio of 1:1 by the method of Example 1. In all of these cases, a solution of 50 mg of the polymer in 10 ml of tetrahydrofuran is used in measurement.

FIG. 4 is a gel permeation chromatogram of a mere blend of the aforesaid polycarbosilane and polytitanosiloxane in a weight ratio of 1:1 (a solution of 50 mg of a polymer blend composed of these polymers each in an amount of 25 mg is used in measurement). The gel permeation chromatogram of the mere blend of the two polymers shown in FIG. 4 is indentical with the chart obtained by superimposing the gel permeation chromatogram of FIG. 1 on that of FIG. 2. The gel permeation chromatogram of the copolymer in FIG. 3 shows a new peak at 8.1 ml of elution volume not seen in any of FIGS. 1, 2 and 4. This means that as a result of the block copolymerization of polycarbosilane and polytitanosiloxane, the molecular weight increases. In GPC, the lower the figure of a peak on the abscissa (elution volume), the higher the corresponding molecular weight.) Furthermore, as compared with the peaks at 10 ml of elution volume in FIGS. 1 and 2, the height of this peak in FIG. 3 is very small. This means that the content of a low-molecular-weight material in the block copolymer decreases markedly. Thus, the results of experiments by GPC show that the organometallic polymer of this invention is not a mere blend of polycarbosilane and polytitanosiloxane, but is a blocked copolymer of increased molecular weight obtained by bonding of the two polymers.

Now, the infrared absorption spectra of these polymers are discussed. FIG. 5 shows an IR spectrum of the polycarbosilane obtained in Referential Example 1; FIG. 6 shows an IR spectrum of the polytitanosiloxane described in Referential Example 2; and FIG. 7 shows an IR spectrum of the organometallic copolymer of this invention described in Example 1. The absorptions at 1250 cm$^{-1}$ and 2100 cm$^{-1}$ in the IR spectrum of FIG. 5 correspond respectively to Si-CH$_3$ and Si-H present in the starting polycarbosilane (these absorptions are absent in the IR spectrum of polytitanosiloxane in FIG. 6). The aforesaid two absorptions exist in the IR spectrum of the copolymer in FIG. 7. When FIG. 5 is compared with FIG. 7 with respect to the ratio of the intensity of an absorption at 2100 cm$^{-1}$ ascribable to Si-H to that of an absorption at 1250 cm$^{-1}$ ascribable to Si-CH$_3$, the above ratio in the IR spectrum of FIG. 5 is 0.690, but the above ratio in FIG. 7 is 0.568 showing a considerable decrease. This shows that as a result of the reaction of polycarbosilane with polytitanosiloxane, some of the Si-H linkages in the polycarbosilanes disappear and a block copolymer of polycarbosilane and polytitanosiloxane is obtained. In other words, the main mechanism of formation of the organometallic copolymer (blocked copolymer) in accordance with this invention is presumably that some of the hydrogen atoms bonded as side-chain groups to the silicon atoms in the structural units $-\!\!+\!\text{Si-CH}_2\!\!+\!\!-$ present in the main chain skeleton of polycarbosilane are liberated, and the silicon atoms are crosslinked through an oxygen atom with some of the silicone atoms and/or titanium atoms of the structural units (-Si-O- and/or -Ti-O-) present in the main chain skeleton of polytitanosiloxane. The ratio of crosslinkage of the organometallic copolymer of Example 1 calculated on the basis of the above IR data is 17.7% supposing that the crosslinkage occurs only by the disappearance of the Si-H linkage).

By comparing the four gel permeation chromatograms shown in FIGS. 9 to 12 and the three infrared absorption spectra shown in FIGS. 13 to 15 in the same way, it can be concluded that an organometallic copolymer composed of a polycarbosilane portion and a polyzirconosiloxane portion as another embodiment of the present invention is a block copolymer resulting from crosslinking of the aforesaid two portions. The ratio of crosslinkage of the organometallic copolymer in Example 4 calculated on the basis of the above IR data is 25.0% (supposing that the crosslinkage takes place only by the disappearance of the Si-H linkages).

The process of this invention for production of the organometallic copolymer of this invention comprises heating a mixture of polycarbosilane and polymetallosiloxane in an organic solvent in an atmosphere inert to the reaction thereby to bond at least some of the silicon atoms of the polycarbosilane to at least some of the silicon atoms and/or metal atoms (M) of the polymetallosiloxane through an oxygen atom. The organic solvent is used to perform the reaction smoothly and to inhibit formation of by-products such as a gel-like material. Suitable solvents are, for example, benzene, toluene, xylene and tetrahydrofuran.

It is essential that the reaction should be carried out in an atmosphere of a gas inert to the reaction (for example, nitrogen, argon, or hydrogen). Use of an oxidizing atmosphere such as air is undesirable since it causes oxidation of the starting polycarbosilane and polymetallosiloxane.

The reaction temperature can be varied over a wide range. For example, heating may be performed at a temperature below the boiling point of the organic solvent used. When it is desired to obtain a copolymer having a high ratio of crosslinkage, it is preferred to perform the crosslinking reaction by heating the reaction mixture to the boiling point of the organic solvent or to a higher temperature after distilling off the solvent. Generally, the preferred reaction temperature is not more than 500° C. The reaction time is not particularly critical, and usually, a period of about 1 to about 10 hours is sufficient. Preferably, the reaction is carried out generally at atmospheric pressure or pressures near it. Reactions in vaccum or under highly reduced pressures is undesirable since low-molecular-weight components distill out of the system and the yield of the desired product is decreased. In performing the process of this invention, the reaction is preferably carried out while feeding an inert gas stream into the reaction zone. This makes it possible to maintain the pressure in the reactor substantially at atmospheric pressure and to prevent a rise in temperature or a rise in pressure which is due to hydrocarbon gases such as methane gas released during the reaction.

The polycarbosilane as one starting material for production of the organometallic copolymer in accordance with this invention is polycarbosilane having a number average molecular weight of about 500 to about 10000 and comprises a main chain skeleton composed mainly of structural units of the formula $-\!\!+\!\!Si\text{-}CH_2\!\!+\!\!-$ in which the silicon atom substantially contains a side-chain group selected from the class consisting of hydrogen, lower alkyl and phenyl. Sometimes, in addition to the above side-chain group, a hydroxyl group is bonded to the silicon atom in the terminal groups of the polycarbosilane.

A process for production of polycarbosilane is known, and the aforesaid polycarbosilane used as a starting material in the present invention may be produced by such a known method. For example, a method of producing polycarbosilane by polymerizing monosilane is disclosed in Fritz: Angew. Chem., 79, p. 657 (1967). U.S. Pat. No. 4,052,430 granted to the present inventors discloses a method for producing polycarbosilane by converting monosilane to polysilane and polymerizing the polysilane. Of the polycarbosilanes used in this invention, polycarbosilane having a main chain skeleton consisting substantially only of structural units of the formula $-\!\!+\!\!Si\text{-}CH_2\!\!+\!\!-$ can be produced by the aforesaid known methods.

Modified polycarbosilane, partly containing a siloxane linkage produced by the method disclosed in U.S. Patent Application Ser. No. 953,518 filed by the present inventors is especially suitable for use as the starting material in this invention. This modified polycarbosilane is polycarbosilane partly containing a siloxane linkage and having a number average molecular weight of 500 to 10000 which consists mainly of structural units of (A) and (B) below in an (A):(B) ratio of from 5:1 to 200:1.

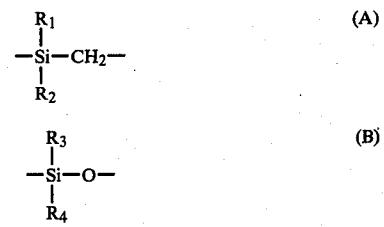

wherein $R_1$, $R_2$, $R_3$ and $R_4$, independently from each other, represent a hydrogen atom, a lower alkyl group or a phenyl group. This modified polycarbosilane can be produced by adding 0.01 to 15% by weight of polyborosiloxane whose skeletal component consists of B, Si and O with at least a part of the side chain of Si having a phenyl group to polysilane of the structure

wherein n is at least 3, and $R_1$ and $R_2$ are as defined above; and heating the resulting polymer mixture usually at 250° C. or higher, preferably 300° to 500° C., in an atmosphere inert to the reaction usually for 8 to 10 hours.

The polymetallosiloxane as the other starting material used to produce the organometallic copolymer in the process of this invention has a number average molecular weight of about 500 to about 10000 and contains a main chain skeleton consisting mainly of metalloxane units of the formula $-\!\!+\!\!M\text{-}O\!\!+\!\!-$ and siloxane units of the formula $-\!\!+\!\!Si\text{-}O\!\!+\!\!-$, the ratio of the total number of the metalloxane units to that of the siloxane units being in the range of from 30:1 to 1:30, most of the silicon atoms in the siloxane units having a side-chain group selected from the class consisting of lower alkyl and phenyl, and most of the metal atoms (M) in the metalloxane units having a lower alkoxy, phenoxy or acetylacetoxy group as a side-chain group. Sometimes, in addition to the aforesaid side-chain group, a hydroxyl group is bonded to the silicon atoms or metal atoms in the terminal groups of the polymetallosiloxane.

Methods for production of polymetallosiloxanes are known, and the polymetallosiloxane used in this invention can be produced by such a known method. Typical methods of synthesis include, for example, (a) co-hydrolysis of organochlorosilane with a titanium or zirconium alkoxide, titanium or zirconium phenoxide, or titanium or zirconium acetylacetonate, (b) dehydrochlorinating condensation of organosilanol and titanium or zirconium chloride, or (c) dealcoholizing condensation of organosilanol with a titanium or zirconium alkoxide, titanium or zirconium phenoxide, or titanium or zirconium acetylacetonate.

In the synthesis of the polymetallosiloxane used in this invention by the methods (a) to (c) above, formation of the -Si-O-M-O- linkage is schematically shown as follows:

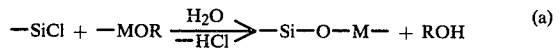  (a)

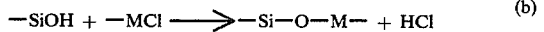  (b)

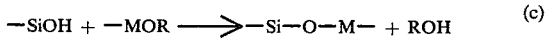  (c)

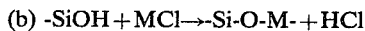

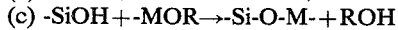

A method for synthesis of a polymetallosiloxane is described, for example, in Inorganic Polymers (F. G. A. Stone, Academic Press, 1962).

The polymetallosiloxane used as the starting material in this invention is a polymer soluble in an organic solvent (e.g., benzene, toluene, xylene, acetone, tetrahydrofuran).

If among the siloxane units of the formula $-(-Si-O-)-$, chain-terminating monofunctional siloxane units located at the terminals of the polymer chain are excluded and only those siloxane units extending the chain are considered, it is seen that these chain-extending siloxane units contain three types of siloxane units, i.e.

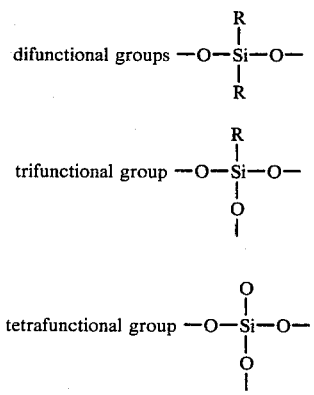

In the above formulae, R represents a side-chain organic group. All of these three types of siloxane units can be the chain-extending units of the polymetallosiloxane used in this invention. If, however, the content of the tetrafunctional siloxane units increases, the polymer generally contains a large proportion of a crosslinked structure and becomes insoluble in organic solvents. In the polymetallosiloxane used in this invention, most of the chain-extending siloxane units are difunctional or trifunctional siloxane units, and the content of the tetrafunctional siloxane units should be small. Accordingly, most of the silicon atoms of the chain-extending siloxane units should have bonded thereto one or two side-chain organic groups R (lower alkyl or phenyl). In other words, the polymetallosiloxane used in this invention may contain a minor amount of the tetrafunctional siloxane units. The amount should be such that the tetrafunctional siloxane units do not impair the solubility of the polymer in organic solvents. Preferably, the chain-extending siloxane units of the polymetallosiloxane used in this invention consist substantially of difunctional and/or trifunctional siloxane units.

Likewise, of the metalloxane units of the formula $-(-M-O-)-$, the chain-extending metalloxane units include difunctional groups, trifunctional groups and tetrafunctional groups. For the same reason as mentioned above, in the polymetallosiloxane used in this invention, most of the chain-extending metalloxane units should contain two side-chain organic groups selected from lower alkoxy, phenoxy or acetylacetoxy (difunctional), or one such group (trifunctional). Preferably, the chain-extending metalloxane units consist substantially of difunctional and/or trifunctional metalloxane units.

In the polymetallosiloxane used in this invention, the ratio of the total number of the metalloxane units to that of the siloxane units is in the range of from 30:1 to 1:30.

The polymetallosiloxane used in this invention comprises a skeleton resulting from random bonding of the siloxane units $-(-Si-O-)-$ and the metalloxane units $-(-M-O-)-$, and may be in various forms such as chains, rings, ladders, cages or networks.

According to the process of this invention, the polycarbosilane and the polymetallosiloxane are mixed in such proportions that the ratio of the total number of the carbosilane units $-(-Si-CH_2-)-$ to the sum of the total number of the metallosiloxane units $-(-M-O-)-$ and the total number of the siloxane units $-(-Si-O-)-$ is in the range of from 100:1 to 1:100. The mixture is reacted to form a crosslinkage between the two polymers. As previously stated, the crosslinking reaction is mainly a reaction of bonding through an oxygen atom those silicon atoms in the structural units $-(-Si-CH_2-)-$ of the main chain skeleton of the polycarbosilane from which hydrogen atoms bonded as a side-chain group have been liberated, to some of the silicone atoms and/or metal atoms in the siloxane units and/or the metalloxane units in the main chain skeleton of the polymetallosiloxane. This results in formation of the organometallic polymer of this invention which is a crosslinked block copolymer. Thus, when the polycarbosilane portion of the block copolymer is considered, the silicon atoms present in the intermediate portion of the main chain structure which participates in the crosslinking reaction have two side-chain groups before the crosslinking reaction, but one side chain group after the crosslinking reaction, and the silicon atoms present in the intermediate portion of the main chain skeleton which is not involved in the reaction substantially contain two sidechain groups selected from hydroxy hydrogen, lower alkyl and phenyl.

The organometallic polymer produced by the process of this invention described hereinabove is a block copolymer having a molecular weight of 1000 to 50000 resulting from crosslinking of the polycarbosilane with the polymetallosiloxane. It is a thermoplastic material which melts usually at 50° to 400° C. It is soluble in organic solvents such as benzene, toluene, xylene and tetrahydrofuran.

FIG. 7 shows an infrared absorption spectrum of the organometallic copolymer of this invention obtained in Example 1. The copolymer described in Example 1 is a block copolymer composed of polycarbosilane partly containing siloxane linkages and obtaibed from polydimethylsilane and polyborodiphenylsiloxane and polytitanosiloxane obtained from diphenylsilanediol and titanium tetrabutoxide. In view of the infrared absorption spectra of the starting materials (polycarbosilane and polytitanosiloxane) shown in FIGS. 5 and 6, the infrared absorptions of the block copolymer shown in FIG. 7 are assigned as follows:

Si-$C_6H_5$ in the vicinity of 500 cm$^{-1}$ and 700 cm$^{-1}$; Si-$CH_3$ in the vicinity of 800 cm$^{-1}$ and at 1250 cm$^{-1}$; Si-O-Ti at 920 cm$^{-1}$; Si-$CH_2$-Si at 1020–1030 cm$^{-1}$; Si-O at 1050 cm$^{-1}$ and 1120 cm$^{-1}$; Si-$C_6H_5$ at 1430 cm$^{-1}$; Si-H at 2100 cm$^{-1}$; C-H in Ti-$OC_4H_9$ at 2850–2940 cm$^{-1}$; C-H at 2900 cm$^{-1}$ and 2950 cm$^{-1}$ and C-H in $C_6H_5$ in the vicinity of 3050 cm$^{-1}$.

FIG. 15 shows the infrared absorption spectrum of the organometallic copolymer of this invention obtained by the method of Example 4. The copolymer described in Example 4 is a block copolymer composed of polycarbosilane partly containing siloxane linkages and obtained from polydimethylsilane and polyborodiphenylsiloxane and polyzirconosiloxane obtained from diphenylsilanediol and zirconium tetrabutoxide. In view of the infrared absorption spectra of the starting materials (polycarbosilane and polyzirconosiloxane) shown in FIGS. 13 and 14, the infrared absorptions of the block copolymer shown in FIG. 15 are assigned as follows:

Si-$C_6H_5$ in the vicinity of 500 cm$^{-1}$ and 700 cm$^{-1}$; Si-$CH_3$ in the vicinity of 800 cm$^{-1}$ and at 1250° C.; Si-O-Zr at 950 cm$^{-1}$, Si-$CH_2$-Si at 1020–1030 cm$^{-1}$; Si-O at 1050 cm$^{-1}$ and 1120 cm$^{-1}$; Si-$C_6H_5$ at 1430 cm$^{-1}$; Si-H at 2100 cm$^{-1}$; C-H in Zr-$OC_4H_9$ at 2850–2940 cm$^{-1}$, C-H at 2900 cm$^{-1}$ and 2950 cm$^{-1}$, and C-H in $C_6H_5$ in the vicinity of 3050 cm$^{-1}$.

The crosslinked block copolymer of this invention composed of the polycarbosilane portion and the polytitanosiloxane portion can be converted by firing under vacuum, in an inert gaseous atmosphere or in a non-oxidizing gaseous atmosphere into a composite carbide composed mainly of TiC and SiC and having better oxidation resistance at high temperatures than conventional TiC, in which TiC and SiC are partly dissolved in each other in the solid state.

The crosslinked block copolymer of this invention composed of the polycarbosilane portion and the polyzirconosiloxane portion can be converted by firing in an inert gaseous atmosphere or a non-oxidizing gaseous atmosphere into a composite carbide composed mainly of ZrC and SiC and having higher mechanical strength than conventional SiC, in which ZrC and SiC are partly in each other in the solid state.

Since the organometallic copolymer of this invention composed of the polycarbosilane portion and the polytitano(or zircono)siloxane portion melts by heating, or is soluble in an organic solvent, it can be molded into various shapes. By firing the molded articles at a temperature of at least 700° C. in an inert atmosphere or a nonoxidizing atmosphere, molded articles of composite carbides of the aforesaid structure having very good properties can be obtained.

Examples of such molded articles are continuous fibers, films, coated films, and powders composed mainly of these composite carbides.

The organometallic copolymer of this invention can also be used as a sintering binder or an impregnating agent. Furthermore, since it has superior heat resistance, it is expected to find various applications without converting it into carbides.

The following Referential Examples and Examples illustrate the present invention more specifically.

Referential Example 1

A 5-liter three-necked flask was charged with 2.5 liters of anhydrous xylene and 400 g of sodium, and they were heated to the boiling point of the xylene in a stream of nitrogen gas, and 1 liter of dimethyldichlorosilane was added dropwise over 1 hour. After the addition, the mixture was heated under reflux for 10 hours to form a precipitate. The precipitate was filtered and washed first with methanol and then with water to afford 420 g of polydimethylsilane as a white powder.

Separately, a 759 g of diphenyldichlorosilane and 124 g of boric acid were heated at 100° to 120° C. in n-butyl ether in a nitrogen gas atmosphere. The resulting white resinous product was further heated in vacuo at 400° C. for 1 hour to afford 530 g of polyborodiphenylsiloxane.

Then, 0.125 g of polyborodiphenylsiloxane was added to 250 g of the polydimethylsilane, and the mixture was heated to 350° C. in a stream of nitrogen in a 2-liter quartz tube equipped with a reflux tube and polymerized for 3 hours to afford polycarbosilane used as a starting material for the copolymer of this invention. The polymer was allowed to cool at room temperature, and xylene was added. The solution was taken out, and xylene was evaporated. The residue was concentrated in a nitrogen gas stream by heating it at 300° C. for 4 hours to afford 84 g of solid product.

The polymer had a number average molecular weight, determined by the vapor pressure osmotic pressure method (VPO method), of 1500. The IR spectrum of this product was measured. As shown in FIG. 5, it showed an absorption of Si-$CH_3$ in the vicinity of 800 cm$^{-1}$ and at 1250 cm$^{-1}$, an absorption of C-H at 1400, 2900 and 2950 cm$^{-1}$, an absorption of Si-H at 2100 cm$^{-1}$, an absorption of Si-$CH_2$-Si at 1020 and 1355 cm$^{-1}$, an absorption of Si-O in the vicinity of 1050 cm$^{-1}$, and an absorption of Si-$C_6H_5$ at 700, 1120 and 1430 cm$^{-1}$.

The polymer obtained was polycarbosilane having the following constituent elements:

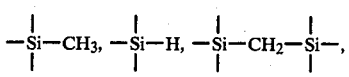

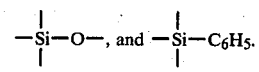

Referential Example 2

Diphenylsilanediol (864 g) and 340 g of titanium tetrabutoxide were mixed with xylene. The mixture was heated at 150° C. under reflux for 1 hour in a nitrogen gas. After the reaction, the insoluble matter was removed and the xylene solvent was removed by evaporator. The resulting intermediate product was further polymerized at 300° C. for 1 hour in a nitrogen gas to obtain polytitanosiloxane in which the ratio of the total number of titanoxane units to that of siloxane units was 1:4. The polymer had a number average molecular weight, determined by the VPO method, of 1600.

The infrared absorption spectrum of this product was measured. As shown in FIG. 6, it showed a slight absorption of Si-OH in the vicinity of 3600 cm$^{-1}$, an absorption of C-H in Ti-OC$_4$H$_9$ at 2850-2940 cm$^{-1}$, an absorption of the benzene ring in the vicinity of 1600 cm$^{-1}$ and 1400 cm$^{-1}$, an absorption of Si-O at 1150-1000 cm$^{-1}$, an absorption of Ti-O in the Ti-O-Si linkage at 920 cm$^{-1}$.

The resulting polymer was a polymer having a skeleton consisting of Ti, Si and O with a phenyl group in the side chain of Si and a butoxy group in the side chain of Ti.

EXAMPLE 1

Polycarbosilane (40 g) obtained in Referential Example 1 and 40 g of polytitanosiloxane obtained in Referential Example 2 were mixed with 400 ml of xylene to form a homogeneous solution. The solution was reacted under reflux at 130° C. for 3 hours with stirring. After the refluxing reaction, the temperature was raised further to 200° C., and the xylene solvent was distilled off. The polymerization was carried out at 200° C. for 2 hours to form an organometallic copolymer having a number average molecular weight, determined by the VPO method, of 3550.

As can be seen from a comparison of the gel permeation chromatogram of this product shown in FIG. 3 with that of the mere blend of the polycarbosilane obtained in Referential Example 1 and the polytitanosiloxane obtained in Referential Example 2, the polymer obtained is not a mere blend of the polycarbosilane and the polytitanosiloxane, but a copolymer having increased molecular weight resulting from the reaction of these starting polymers. Furthermore, it is seen from a comparison of the infrared absorption spectrum of the resulting product shown in FIG. 7 with those of the polycarbosilane and polytitanosiloxane shown in FIGS. 5 and 6 that the product obtained consisted of a polycarbosilane portion and a polytitanosiloxane portion in which the polycarbosilane portion was crosslinked with the polytitanosiloxane portion as a result of partial disappearance of the Si-H linkage in the polycarbosilane portion and the bonding of this portion to at least some of the silicon atoms and/or titanium atoms of the polytitanosiloxane portion through an oxygen atom. The ratio of the total number of the -Si-CH$_2$- units in the polycarbosilane portion to the sum of the total number of the ─(Ti-O)─ units and the total number of the ─(Si-O)─ units in the polytitanosiloxane portion was 7:2.

Figure 8:
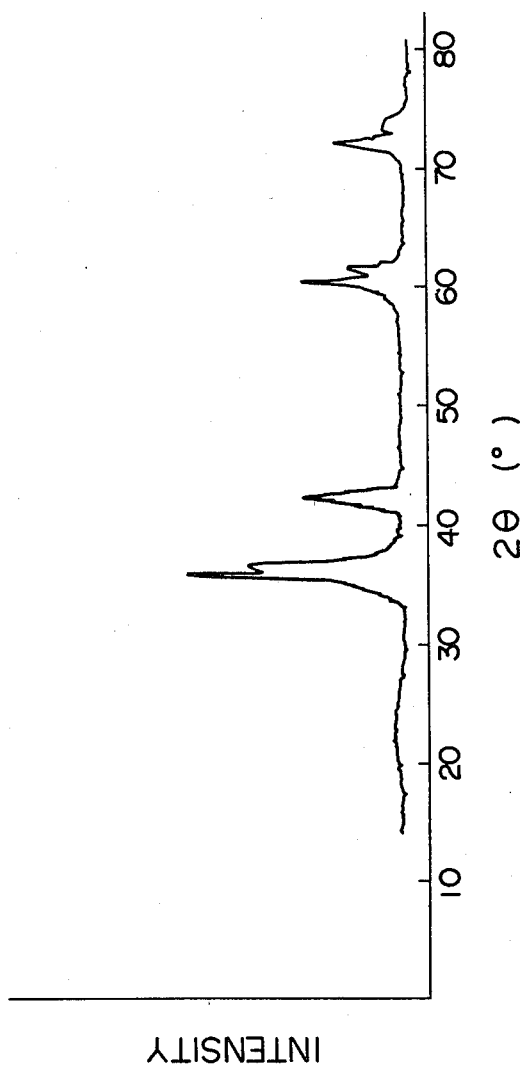
FIG. 8 is an X-ray powder diffraction pattern of a composite carbide obtained by firing the organometallic copolymer of Example 1 at 1700° C. in a nitrogen atmosphere.

The resulting copolymer was heated to 1700° C. over 8.5 hours in an atmosphere of nitrogen, and fired at 1700° C. for 1 hour to form a black solid product. The X-ray powder diffraction pattern of this substance was determined. As shown in FIG. 8, the X-ray powder diffraction pattern of this substance showed a diffraction line (111) of β-SiC at $2\theta = 35.8°$, a diffraction line (220) of β-SiC at $2\theta = 60.1°$, a diffraction line (311) of β-SiC at $2\theta = 72.1°$, a diffraction line (200) of TiC at $2\theta = 42.4°$, a diffraction line (111) of TiC at $2\theta = 36.4°$, a diffraction line (220) of TiC at $2\theta = 61.4°$, and a diffraction line (113) of TiC at $2\theta = 73.5°$.

From the fact that the diffraction lines of TiC in the above diffraction pattern were shifted to a higher angle side than those of conventional TiC and the lattice constant of TiC differs from that of conventional TiC, it is presumed that the resulting product is a composite carbide composed mainly of β-SiC and TiC which are partly formed in each other in the solid state.

EXAMPLE 2

Polytitanosiloxane having a number average molecular weight of 960 with a ratio of the total number of titanoxane units to that of siloxane units being 1:2 was produced in the same way as in Referential Example 2 except that 600 g of diphenylsilanediol and 394 g of titanium tetraisopropoxide were mixed with xylene, and after removing the solvent, the reaction was performed at 250° C. for 30 minutes. Eighty grams of the above polymer and 40 g of polycarbosilane obtained in Referential Example 1 were mixed with 500 ml of xylene to form a homogeneous solution. In a nitrogen gas atmosphere, the solution was reacted under reflux at 130° C. for 2 hours with stirring. After the refluxing reaction, the temperature was raised further to 200° C. to distill off the xylene solvent. The residue was polymerized at 200° C. for 2 hours to afford an organometallic copolymer having a number average molecular weight of 5700.

In the resulting polymer, the ratio of the -Si-CH$_2$- units in the polycarbosilane portion to the sum of the total number of the ─(Ti-O)─ units and the ─(Si-O)─ units in the polytitanosiloxane portion was about 7:4.

EXAMPLE 3

The polycarbosilane (72 g) synthesized in Referential Example 1 and 8 g of the polytitanosiloxane synthesized in Referential Example 2 were mixed with 400 ml of benzene to form a homogeneous solution. The solution was heated under reflux at 70° C. for 5 hours in an atmosphere of nitrogen. After the reaction, the reaction mixture was heated to distill off benzene, and the residue was polymerized at 250° C. for 1 hour to afford an organometallic copolymer having a number average molecular weight of 8200. The resulting polymer was a uniform transparent resinous product. In the resulting resinous product, the ratio of the total number of the ─(Si-CH$_2$)─ units in the polycarbosilane portion to the sum of the total number of the ─(Ti-O)─ units and the total number of the ─(Si-O)─ units in the polytitanosiloxane portion was about 31:1.

Referential Example 3

A 5-liter three-necked flask was charged with 2.5 liters of anhydrous xylene and 400 g of sodium, and they were heated to the boiling point of the xylene in a stream of nitrogen gas. One liter of dimethyldichlorosilane was added dropwise over 1 hour. After the addition, the mixture was heated under reflux for 10 hours to form a precipitate. The precipitate was filtered and washed first with methanol and then with water to afford 420 g of polydimethylsilane as a white powder.

Separately, 759 g of diphenyldichlorosilane and 124 g of boric acid were heated in n-butyl ether in an atmosphere of nitrogen at a temperature of 100° to 120° C. The resulting white resinous product was further heated in vacuum at 400° C. for 1 hour to afford 530 g of polyborodiphenylsiloxane.

To 250 g of the polydimethylsilane was added 8.27 g of the polyborodiphenylsiloxane. The mixture was heated to 350° C. in a 2-liter quartz tube equipped with a reflux tube, and polymerized for 6 hours to afford polycarbosilane used as a raw material for the copolymer of this invention. The product was allowed to cool at room temperature, and then xylene was added. The solution was taken out, and xylene was evaporated. The residue was concentrated at 330° C. for 2 hours in a stream of nitrogen to afford 130 g of a solid polymer. The polymer had a number average molecular weight, determined by the VPO method, of 1500.

The infrared spectrum of this substance was measured. As shown in FIG. 13, this spectrum showed an absorption of Si-CH$_3$ in the vicinity of 800 cm$^{-1}$ and 1250 cm$^{-1}$, an absorption of C-H at 1400, 2900 and 2950 cm$^{-1}$, an absorption of Si-H at 2100 cm$^{-1}$, an absorption of Si-CH$_2$-Si at 1020 and 1355 cm$^{-1}$, an absorption of Si-O in the vicinity of 1100 cm$^{-1}$, and an absorption of Si-C$_6$H$_5$ at 700, 1120 and 1430 cm$^{-1}$.

The polymer obtained was polycarbosilane having the following constituent elements.

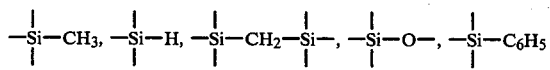

Referential Example 4

Diphenylsilanediol (864 g) and 383 g of zirconium tetrabutoxide were mixed with xylene. The mixture was reacted at 150° C. for 1 hour under reflux in an atmosphere of nitrogen gas. After the reaction, the insoluble matter was removed by filtration, and the xylene solvent was evaporated off by an evaporator. The resulting intermediate product was further polymerized at 300° C. for 1 hour in a nitrogen gas to afford polyzirconosiloxane in which the ratio of the total number of zirconoxane units to the that of siloxane units was 1:4. The polymer had a number average molecular weight, determined by the VPO method, of 1650. The infrared absorption spectrum of this substance was measured. As shown in FIG. 14, it showed a slight absorption of Si-OH in the vicinity of ~3600 cm$^{-1}$, an absorption of the benzene ring in the vicinity of 3050 cm$^{-1}$, an absorption of C-H in Zr-OC$_4$H$_9$ at 2850-2940 cm$^{-1}$ an absorption of the benzene ring at 1600-1350 cm$^{-1}$, an absorption of Si-O at 1150-1000 cm$^{-1}$, and an absorption of Zr-O in the Zr-O-Si linkage in the vicinity of 950 cm$^{-1}$.

The resulting polymer had a skeleton consisting of Zr, Si and O with a phenyl group attached to the side chain of Si and a butoxy group attached to the side chain of Zr.

EXAMPLE 4

Forty grams of the polycarbosilane obtained in Referential Example 3 and 40 g of the polyzirconosiloxane obtained in Referential Example 4 were mixed with 400 ml of xylene to form a homogeneous solution. In an atmosphere of nitrogen gas, the solution was reacted under reflux at 130° C. for 3 hours with stirring. After the refluxing reaction, the temperature of the reaction system was raised further to 200° C. to distill off the xylene solvent. The residue was polymerized at 200° C. for 2 hours to afford an organometallic copolymer. This polymer had a number average molecular weight, determined by the VPO method, of 3600.

As is seen from a comparison of the gel permeation chromatogram of this substance shown in FIG. 11 with that of the mere blend of the polycarbosilane of Referential Example 3 and the polyzirconosiloxane of Referential Example 4 shown in FIG. 12, the polymer obtained was not a mere blend of the polycarbosilane and the polyzirconosiloxane, but a copolymer of increased molecular weight obtained as a resulting from the reaction of these polymers.

Furthermore, it is seen from a comparison of the IR spectrum of this substance shown in FIG. 15 and the IR spectra of the polycarbosilane and the polyzirconosiloxane shown in FIGS. 13 and 14 that the polymer obtained consisted of the polycarbosilane portion and the polyzirconosiloxane portion, in which the polycarbosilane portion was crosslinked with the polyzirconosiloxane portion as a result of the partial disappearance of the Si-H linkages in the polycarbosilane portion and the bonding of this portion to at least some of the silicon atoms and/or zirconium atoms of the polyzirconosiloxane portion through an oxygen atom.

The ratio of the total number of the $+$Si-CH$_2+$ units in the polycarbosilane portion to the sum of the total number of the $+$Zr-O$+$ units and the total number of the $+$Si-O$+$ units in the polyzirconosiloxane portion was 7:2.

The resulting polymer was heated to 1700° C. over the course of 8.5 hours in an atmosphere of nitrogen, and fired at 1700° C. for 1 hour to afford a black solid product. The X-ray powder diffraction pattern of this substance was measured. As shown in FIG. 16, it showed a diffraction line (111) of $\beta$-SiC at $2\theta=35.8°$, a diffraction line (220) of $\beta$-SiC at $2\theta=60.1°$, a diffraction line (311) of $\beta$-SiC at $2\theta=72.1°$, a diffraction line (111) of ZrC at $2\theta=33.7°$, a diffraction line (200) of ZrC at $2\theta=39.1°$, a diffraction line (220) of ZrC at $2\theta=36.3°$, and a diffraction line (311) of ZrC at $2\theta=67.0°$. From the fact that the diffraction lines of ZrC are shifted to a higher angle side than those of conventional ZrC and the its lattice constant differs from conventional ZrC, it is presumed that the resulting substance is a composite carbide composed mainly of $\beta$-SiC and ZrC which are partly dissolved in each other in the solid state.

EXAMPLE 5

Polyzirconosiloxane having a number average molecular weight of 950 in which the ratio of the total number of zirconoxane units and that of siloxane units was 1:2 was produced in the same way as in Example Referential Example 4 except that 600 g of diphenylsilanediol and 675 g of tetrakis-acetylacetonatozirconium were mixed with a mixture of xylene and ethanol in a volume ratio of 4:1, and after the removal of the solvent, the reaction was carried out at 250° C. for 30 minutes.

This polymer (95 g) and 40 g of the polycarbosilane obtained in Referential Example 3 were mixed with 500 ml of xylene to form a homogeneous solution. The solution was reacted under reflux at 130° C. for 2 hours in an atmosphere of nitrogen gas. After the refluxing reaction, the temperature was further raised to 200° C. to distill off the xylene solvent. The residue was polymerized at 200° C. for 2 hours to afford an organometallic copolymer having a number average molecular weight of 5670.

The ratio of the total number of $-\!\!+\!\!Si\text{-}CH_2\!\!+\!\!-$ units of the polycarbosilane portion to the sum of the total number of $-\!\!+\!\!Zr\text{-}O\!\!+\!\!-$ units and the total number of $-\!\!+\!\!Si\text{-}O\!\!+\!\!-$ units in the polyzirconosiloxane portion was about 7:4.

EXAMPLE 6

Benzene (400 ml) was added to a mixture of 72 g of the polycarbosilane synthesized in Referential Example 3 and 8 g of the polyzirconosiloxane synthesized in Referential Example 4 to form a homogeneous solution. The solution was reacted under reflux at 70° C. for 5 hours with stirring in an atmosphere of nitrogen. After the reaction, the reaction mixture was further heated to distill off benzene, and the residue was polymerized at 250° C. for 1 hour to afford an organometallic polymer having a number average molecular weight of 8160. The resulting polymer was a uniform and clear resinous product. In the resulting product, the ratio of the total number of $-\!\!+\!\!Si\text{-}CH_2\!\!+\!\!-$ units in the polycarbosilane portion to the sum of the total number of $-\!\!+\!\!Zr\text{-}O\!\!+\!\!-$ units and the total number of $-\!\!+\!\!Si\text{-}O\!\!+\!\!-$ units in the polyzirconosiloxane portion was about 31:1.

What we claim is:

1. An organometallic copolymer having a number average molecular weight of about 1000 to about 50000 composed of (A) a polycarbosilane portion with a number average molecular weight of about 500 to about 10000 having a main chain skeleton composed mainly of carbosilane units of the formula $-\!\!+\!\!Si\text{-}CH_2\!\!+\!\!-$ and (B) a polymetallosiloxane portion with a number average molecular weight of about 500 to about 10000 having a main chain skeleton composed of metalloxane units of the formula $-\!\!+\!\!M\text{-}O\!\!+\!\!-$ wherein M represents a metal atom selected from the group consisting of Ti and Zr and siloxane units of the formula $-\!\!+\!\!Si\text{-}O\!\!+\!\!-$; each silicon atom of said carbosilane units having bonded thereto a side-chain group selected from the group consisting of hydrogen, lower alkyl and phenyl, most of the metal atoms M in said metalloxane units having bonded thereto a side-chain group selected from the group consisting of lower alkoxy, phenoxy and acetylacetoxy, most of the silicon atoms of said siloxane units having bonded thereto a side-chain group selected from the group consisting of alkyl and phenyl, the ratio of the total number of said metalloxane units to that of said siloxane units being in the range of from about 30:1 to about 1:30, the ratio of the total number of said carbosilane units to the sum of the total number of said metalloxane units and the total number of said siloxane units being in the range of about 100:1 to about 1:100, and at least some of the silicon atoms of said polycarbosilane portion (A) being bonded through oxygen to at least some of the metal atoms M and/or silicon atoms of said polymetallosiloxane portion (B) whereby the polycarbosilane portion (A) is crosslinked with the polymetallosiloxane portion (B).

2. An organometallic copolymer of claim 1 which is a thermoplastic material that melts when heated to 50° to 400° C.

3. An organometallic copolymer of claim 1 which is soluble in organic solvents.

* * * * *